(12) United States Patent
Kim et al.

(10) Patent No.: US 7,180,538 B2
(45) Date of Patent: Feb. 20, 2007

(54) DIGITAL TELEVISION TEST STREAM GENERATOR, METHOD THEREOF, AND TEST STREAM RECORDING MEDIUM USING THE SAME

(75) Inventors: Jong-Sik Kim, Daegu (KR); Douk-Hwan Park, Daegu (KR); Hi-Chul Jang, Gyeongsangbuk-Do (KR); Ki-Sun Song, Gyeongsangbuk-Do (KR); Kyu-Ik Sohng, Daegu (KR); Chan-Ho Han, Daegu (KR)

(73) Assignee: LG Electronics Inc., Seoul (KR)

(*) Notice: Subject to any disclaimer, the term of this patent is extended or adjusted under 35 U.S.C. 154(b) by 697 days.

(21) Appl. No.: 10/411,368

(22) Filed: Apr. 11, 2003

(65) Prior Publication Data
US 2003/0234889 A1    Dec. 25, 2003

(30) Foreign Application Priority Data
Apr. 13, 2002  (KR) ............... 10-2002-0020207

(51) Int. Cl.
H04N 17/00 (2006.01)
G06F 7/02 (2006.01)

(52) U.S. Cl. ............... 348/181; 348/192; 714/48; 714/819

(58) Field of Classification Search ............... 348/180, 348/181, 192–194, 515; 375/224, 226, 227, 375/240.27, 240.28; 702/66, 69, 71–75, 702/81, 122; 714/47, 48, 799, 819; 370/474, 370/498, 535
See application file for complete search history.

(56) References Cited

U.S. PATENT DOCUMENTS 6,101,195 A * 8/2000 Lyons et al. ............... 370/498
6,826,185 B1 * 11/2004 Montanaro et al. ...... 370/395.1
6,988,238 B1 * 1/2006 Kovacevic et al. ......... 714/799

* cited by examiner

Primary Examiner—Victor R. Kostak
(74) Attorney, Agent, or Firm—Fleshner & Kim LLP.

(57) ABSTRACT

A DTV receiver test stream generator which prevents discontinuity phenomenon of a video and an audio, a method for generating the DTV receiver test stream, and a recording medium where the DTV test stream having no discontinuity phenomenon is recorded. To this end, a test stream for a function test or a performance valuation of the DTV receiver is generated and a reproduction time is equalized on the basis of the least common multiple of a video frame time, an audio frame time, and a TS packet time when the test stream is repeatedly reproduced. According to this, when used at a DTV production field where a test pattern is used or at a broadcasting system which repeatedly transmits the DTV stream of a limited length such as a stationary image, a reliability of the DTV receiver test can be ensured.

29 Claims, 6 Drawing Sheets $n_{vf}$: video frame number  $n_{af}$: ts packet number  $t_a$: audio running time  $t_{TS}$: transport stream time
$n_{af}$: audio frame number  $t_v$: video running time  $t_{vES}$: video es time  $t_{diff}$: difference time between $t_{vES}$ and $t_{TS}$

DIGITAL TELEVISION TEST STREAM GENERATOR, METHOD THEREOF, AND TEST STREAM RECORDING MEDIUM USING THE SAME

BACKGROUND OF THE INVENTION

1. Field of the Invention

The present invention relates to a test stream generating system for testing a digital television (DTV) receiver, and more particularly, to a DTV test stream generator which can prevent discontinuity phenomenon of a video and an audio at the time of repeatedly reproducing a test stream, a method thereof, and a test stream recording medium.

2. Description of the Related Art

Generally, in a digital broadcast system, all processes such as interactive operation, reproduction, compression, and etc. are performed by a digital signal unlike the conventional analogue broadcast system. According to this, the digital broadcasting system is a next-generation broadcasting technique in which a picture quality is clean and superior sound is obtained by subdividing a sound signal from a narrow compass to a wide compass.

In the conventional analogue television broadcasting system, one electric wave can carry only one image information, and sound information had to be sent by another electric wave. Contrary to this, in the digital broadcasting system, one electric wave can carry a plurality of image information and sound information, and information can be compressed without quality deterioration. Therefore, multi-channel can be set in a frequency band of the conventional analogue broadcasting channel. Also, information can be easily controlled by using a computer, and interactive characteristic to send information required by a viewer is possible. According to this, recently, the digital broadcasting system is fast applied and spread through various media such as ground wave, satellite, a cable television, and etc.

A DTV test has to be performed by receiving a signal from the digital broadcasting system. However, actually, the test is possible only in an operation test, and a test for special functions of the digital broadcasting receiver is not performed. Also, a special signal for a performance valuation of the digital broadcasting receiver is not provided. Therefore, a digital television receiver developer generally performs the DTV test by using a virtual broadcasting system for the function test and the performance valuation.

FIG. 1 is an exemplary view showing a notion of a DTV test using a virtual broadcasting system in accordance with the conventional art.

As shown in FIG. 1, for the DTV test using the virtual broadcasting system, a stream generator 101 generates a predetermined audio/video test stream for function test or performance valuation of the DTV receiver, a channel encoder 102 channel-encodes the test stream, a channel up converter 103 modulates and up-converts the channel-encoded test stream into a radio frequency (RF) level to output, a DTV receiver 104 (herein, a set-top box) receives the RF signal, and a measuring means 105 such as an oscilloscope or a display means 106 such as a high definition television/PC monitor (HDTV/PC) performs the function test and the performance valuation for the received test stream.

In the meantime, a length of the test stream required at the time of producing the DTV receiver has to be consecutive as a real broadcasting. Also, various kinds of test stream are required for the function test and the performance valuation of the DTV receiver. According to this, many channels and a large amount of data are generated.

However, a capacity of a computer storage medium which stores the DTV test stream is limited, so that a length of the limited test stream has to be minimized and repeated to reproduce. In the meantime, when the test stream of the limited length is repeated to reproduce, a reproduction time of video and audio elementary stream, ES, is hardly equalized with that of a transport stream, TS. Accordingly, when the test stream is repeatedly reproduced, discontinuity phenomenon of the video and audio is generated due to the disaccord between the TS and ES, so that a product tested in the DTV receiver production field may be misunderstood as an inferior one.

FIG. 2 is an exemplary view showing a discontinuity phenomenon generated when a DTV test stream is repeatedly reproduced.

Referring to FIG. 2, when the test stream ordered and sold for a quality test at the time of producing the DTV receiver is changed from a video frame to the TS, a relation among a video frame time, an audio frame time, and a video ES unit time and a TS packet unit time are shown. That is, a relation among a video frame 201, an audio frame and an audio ES 202, a video ES 203, and a TS packet 204 is shown. In FIG. 2, the discontinuity phenomenon generated when the DTV test stream is repeatedly reproduced results from a time difference $t_{diff}$ between the ES and the TS, that is, a disaccord of a reproduction time, when the ES and the TS are repeatedly reproduced. Accordingly, if the program TS is repeatedly reproduced, the reproduction time difference $t_{diff}$ is accumulated, so that the TS is not transmitted yet at a time point when a transmittance of the video/audio ES has to be completed. That is, since the TS is not transmitted at the time point when the video and audio have to be reproduced, the reproduction is impossible.

TABLE 1

| Stream name | video running time $t_{vf}$ [sec] | Video ES time $t_{ves}$ [sec] | Transport stream time $t_{TS}$ [sec] | difference time between $t_{ves}$ and $t_{TS}$ $t_{diff}$ [sec] |
|---|---|---|---|---|
| np.ts | 37.6 | 37.599577 | 37.6 | 0 |
| sm4.ts | 37.6 | 37.599577 | 37.6 | 0 |
| sa.m2t.1 | 15.015 | 15.037111 | 15.04 | 0.025 |
| sa.m2t.1.new | 15.015 | 14.972825 | 14.975328 | 0.039672 |
| TPhhi_bits.conf | 1.840 | 1.840424 | 1.841648 | 0.001648 |
| Sample.trp | 1.360 | 1.332960 | 1.398720 | 0.03872 |
| VIDn002b.12t | 4.0 | 4.000087 | 3.99998 | 0.000018 |

The table 1 shows an analysis of a reproduction time for the transport stream provided in MPEG. Referring to the table 1, a difference among the video frame reproduction time, the ES reproduction time, the TS reproduction time is generated as tens of msec. The difference is generated when the ES is converted into the TS, because the TS is constituted as a packet unit. The time difference does not greatly influence in case of a non-repeated reproduction. However, in case of the repeated reproduction for the test, that is, in case of repeatedly reproducing the TS of a predetermined length, the discontinuity phenomenon of the video and audio is irregularly generated by the audio in a decoder, a size of a video ES buffer, an ES rate, a frame time, and etc. Accordingly, the discontinuity phenomenon generated due to the disaccord between the TS reproduction time and the ES reproduction time when the limited test stream is repeatedly reproduced influences on a reliability of the DTV receiver test.

SUMMARY OF THE INVENTION

Therefore, an object of the present invention is to provide a DTV receiver test stream generator which prevents discontinuity phenomenon of a video and an audio by generating a test stream for a function test or a performance valuation of the DTV receiver and by equalizing a reproduction time when the test stream is repeatedly reproduced on the basis of the least common multiple of a video frame time, an audio frame time, and a TS packet time, a method for generating the DTV receiver test stream, and a recording medium where the DTV test stream having no discontinuity phenomenon is recorded.

To achieve these and other advantages and in accordance with the purpose of the present invention, as embodied and broadly described herein, there is provided a DTV receiver test stream generator comprises: a test stream storage means where an equalized reproduction time of a transport stream TS and an elementary stream ES is recorded with a predetermined time length for the DTV receiver test; and a reproduction means for reproducing and outputting the TS and ES stored in the test stream storage means by repeating per the set time.

To achieve these and other advantages and in accordance with the purpose of the present invention, as embodied and broadly described herein, there is provided a method for generating a DTV receiver test stream comprising the steps of: searching for audio/video (A/V) source; compressing the A/V source into an ES level; selecting a repetition section where a picture quality is ensured for the compressed A/V stream; and outputting ES/TS repeatedly per a predetermined time by equalizing a reproduction time of the ES and the TS at the time of repeatedly reproducing the A/V stream of the selected section.

In the recording medium where the DTV test stream having no discontinuity phenomenon is recorded, the ES and TS are recorded as a predetermined time by equalizing a reproduction time of the ES and the TS on the basis of the least common multiple of a video frame time, an audio frame time, and a TS packet time.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, a DTV receiver test stream generator which prevents discontinuity phenomenon of a video and an audio by equalizing a reproduction time of ES and TS on the basis of the least common multiple of a video frame time, an audio frame time, and a TS packet time will be explained with reference to FIGS. 3 to 7.

Figure 1:
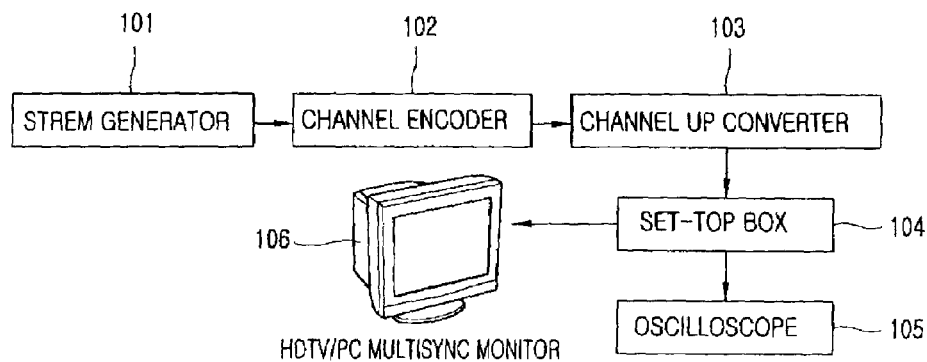
FIG. 1 is an exemplary view showing a notion of a DTV test using a virtual broadcasting system in accordance with the conventional art.
Figure 2:
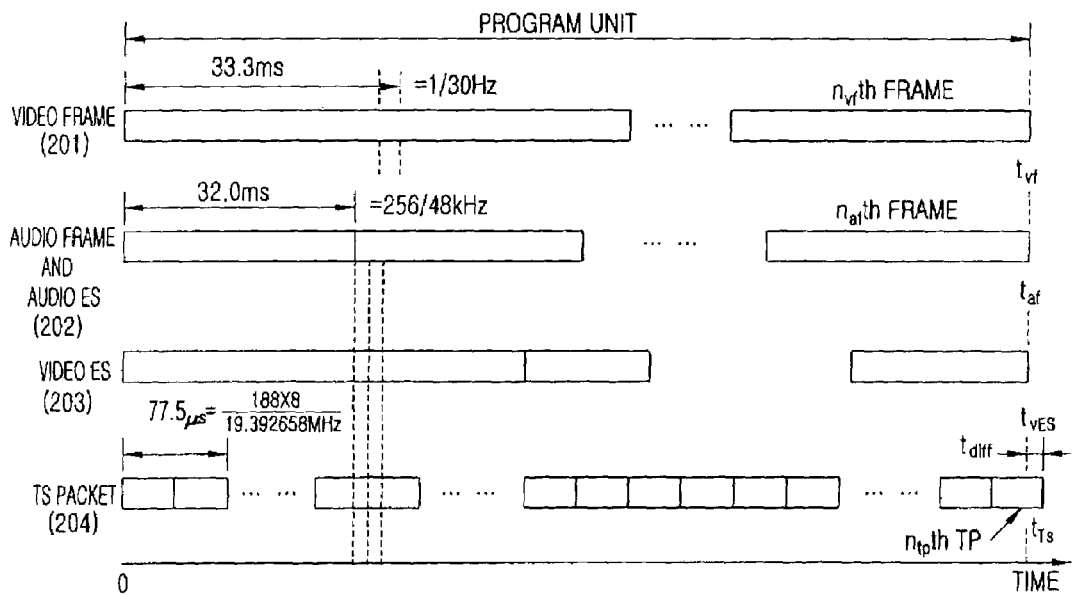
FIG. 2 is an exemplary view showing a discontinuity phenomenon generated when a DTV test stream is repeatedly reproduced.
Figure 3:
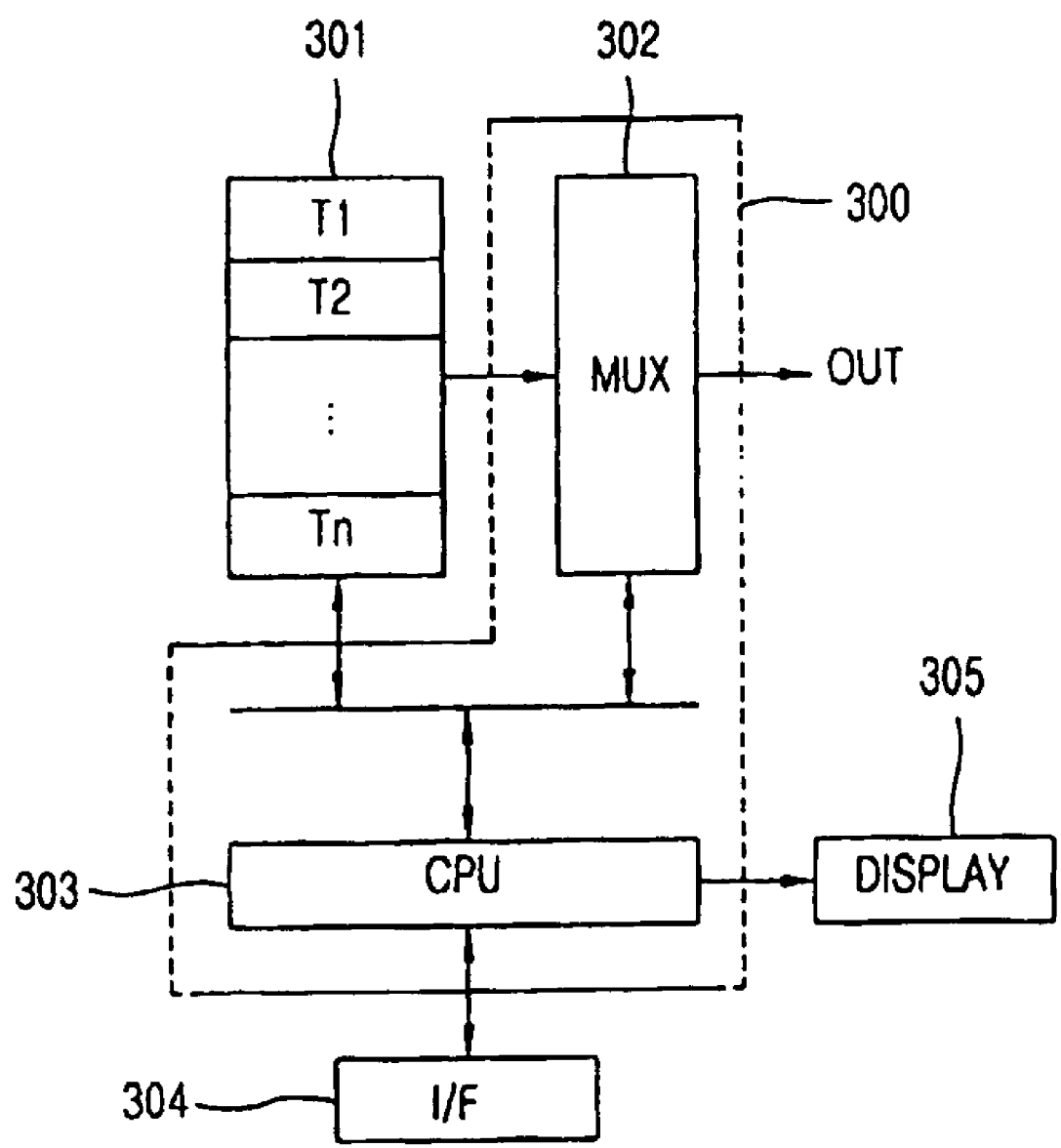
FIG. 3 is a block diagram showing a test stream generator according to the present invention.

FIG. 3 is a block diagram showing a test stream generator according to the present invention.

As shown in FIG. 3, the test stream generator comprises: a test stream storage means (or an image storage means) 301 where TS and ES are stored with an equalized reproduction time; and a reproduction means 300 for reproducing and outputting the TS and ES stored in the test stream storage means 301 repeatedly per the set time length. Herein, the reproduction means 300 includes: a multiplexer MUX 302 for multiplexing the test stream stored in the image storage means 301 and outputting; a CPU for controlling an output of the test stream stored in the image storage means 301; a user's interface 304 for controlling a selection and an output of the test stream; and a display means 305 for displaying information of the test stream outputted through the user's interface 304.

The test stream T1, . . . , Tn stored in the image storage means 301 is ES/TS which is constituted as a predetermined time unit in which discontinuity phenomenon is not generated. Also, the test stream is a test stream more than two constituted as a predetermined pattern and a time unit by a function and a performance of a product to be tested and a size of a DTV system. Also, the image storage means 301 is a memory device like an optic recording/reproducing medium such as a semiconductor memory, an HDD, and a CD. The user's interface 304 such as a key board, a key pad, a mouse, or a touch screen is an interface of which test means can be handle by the user. The display means 305 has a display device such as an HDTV or a PC monitor as an example.

Operations for generating the test stream of the test stream generator according to the present invention will be explained.

First, the test streams T1, . . . Tn of the image storage means 301 are constituted as a predetermined time unit in which various patterns and the TS/ES reproduction time are equalized by a function and a performance of a product to be tested and a size of the DTV system, that is, a broadcasting method. Accordingly, the user (the DTV receiver test operator) selects a predetermined test stream by using the user's interface 304 and the display means 305.

Then, the test stream selected by the user is repeatedly reproduced and outputted from the image storage means 301 by a control means such as a CPU 303. The outputted test stream is outputted by the multiplexer 302 and repeatedly outputted as a predetermined test stream having an equalized reproduction time of the TS/ES. The outputted test stream is used in an ES level test, a TS level test, a channel level test, a base band test, and an RF level test, sequentially.

In conclusion, the test stream outputted from the test stream generator undergoes a channel encoding of a virtual broadcasting system, an RF modulation, and an up-converting process, thereby performing a series of test processes from the ES level test to the RF level test.

Figure 4:
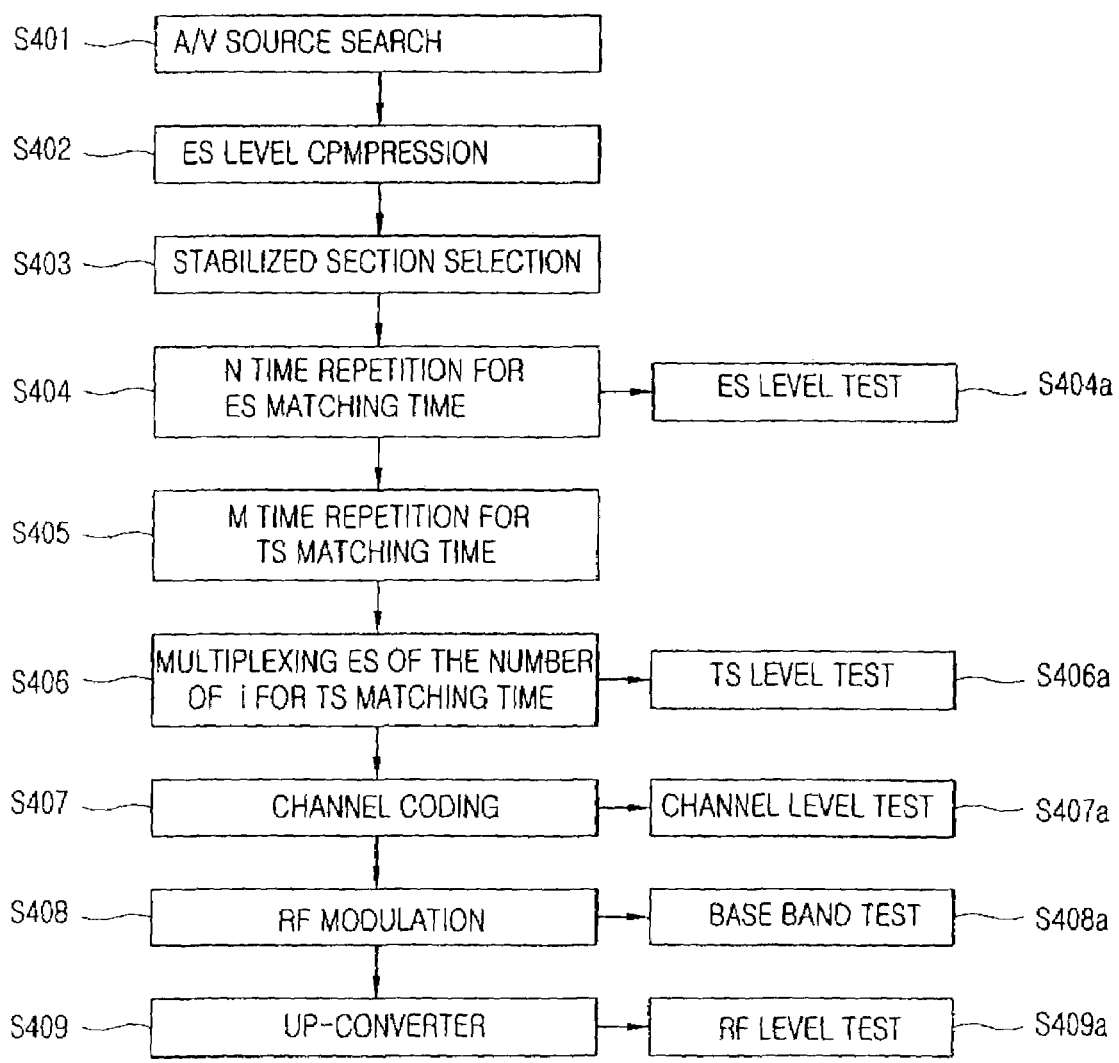
FIG. 4 is a flow chart showing processes for testing a DTV receiver and a method for generating a test stream according to the present invention.

FIG. 4 is a flow chart showing processes for testing the DTV receiver and a method for generating the test stream of the present invention.

First, an audio/video A/V source for generating the test stream is searched, and the A/V source is compressed into an ES level (S401, S402). That is, the A/V source is a predetermined image frame in case of a video, and an audio sample in case of an audio. For example, in case of the video, a video signal photographed by a camera is converted into a digital signal, thereby obtaining a predetermined image frame. The image frame is MPEG-compressed by using a video encoder, thereby obtaining an image compression stream. Also, in case of the audio, an audio signal detected through a microphone is converted into a digital signal, thereby obtaining an audio sample. The audio sample is compressed into Dolby AC-3 by using an audio encoder, thereby obtaining an audio compression stream. Also, as the A/V source, data can be generated from a PC on the basis of a program and system information protocol (PSIP), a transmittance standard prescribed in American advanced television system committee, and thus can be used.

Subsequently, a predetermined section (for example, a group of pictures GOP or block) which is not influenced by repetition is selected in order to ensure a picture quality in the compressed A/V source (S403). That is, in case that the video stream for the test is a moving image, a stabilized section is selected in the stream compressed into the ES level, and in case that the video stream for the test is a stationary image, a multiple of the signal source is selected.

Then, a stream corresponding to the selected section is repeated N times (N frame) for an ES matching time, thereby constituting an ES having no reproduction time difference (S404). Next, an ES level test is performed by using the ES (S404a).

Then, the stream corresponding to the selected section is repeated M times (M frame) for a TS matching time, thereby constituting a TS having no reproduction time difference (S405). Subsequently, the ES having the number of i is multiplexed for the TS matching time (S406). Like this, by multiplexing the ES having the number of i for the TS matching time, a TS level test is performed by using the generated TS stream (S406a).

Next, the TS stream is channel-coded, and a channel level test is performed on the basis of the channel-coded TS stream (S407, S407a).

Then, the channel-coded stream is RF modulated, and a baseband test is performed on the basis of the RF modulated TS stream (S408, S408a).

Finally, the RF modulated TS stream is channel up-converted by using a channel up-converter, and an RF level test is performed on the basis of the channel up-converted TS stream (S409, S409a).

Figure 5:
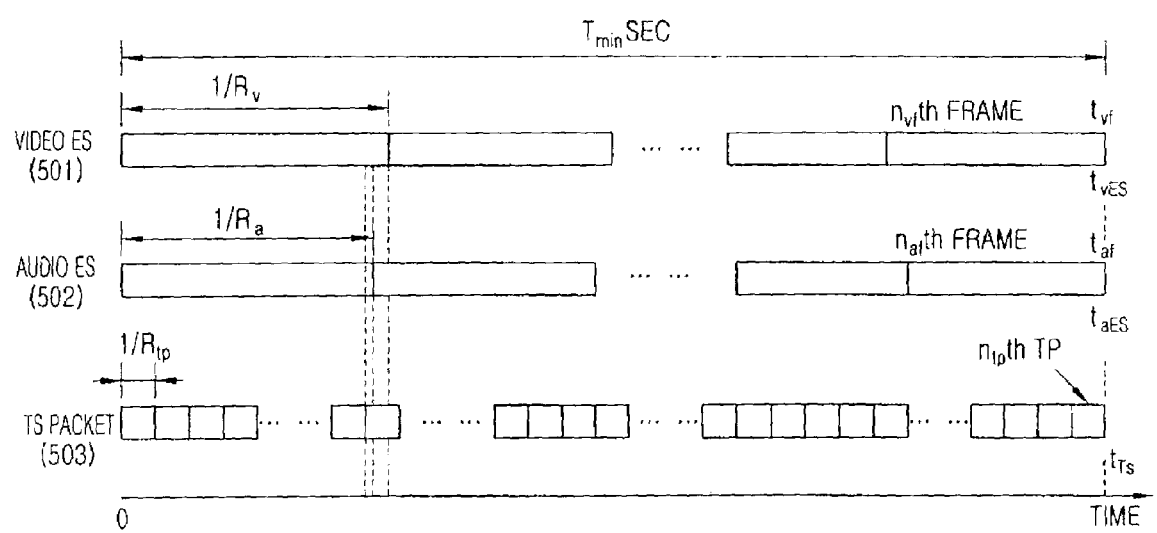
FIG. 5 is an exemplary view showing a test stream of the present invention where a reproduction time of TS and ES is equalized.

FIG. 5 is an exemplary view showing the test stream having an equalized reproduction time of the TS/ES according to the present invention.

Referring to FIG. 5, a relation of reproduction time among a video ES 501, an audio ES 502, a TS packet 503 is shown. That is, FIG. 5 shows that a video ES reproduction time ($T_{vES}$), an audio ES reproduction time ($T_{aES}$), a TS packet reproduction time ($t_{TS}$) are all equalized one another. Herein, the $t_{vf}$ denotes a video frame reproduction time, and $t_{af}$ denotes an audio frame reproduction time.

Processes for generating the test stream having an equalized reproduction time of the TS/ES will be explained.

First, a discontinuity phenomenon generated at the time of repeatedly reproducing the stream results from disaccord between the ES and the TS. According to this, in order to remove the discontinuity phenomenon, the reproduction time of the ES/TS has to be equalized, and the DTV receiver test has to be performed by generating the ES/TS having an equalized reproduction time.

Also, in the present invention, in order to remove the discontinuity phenomenon, an equation showing a time relation among a video frame rate, an audio frame rate, and a TS packet transmittance rate was obtained. That is, time in which the ES reproduction time of the video/audio and the TS reproduction time are equalized was obtained. Herein, the time in which the ES reproduction time is equalized with the TS reproduction time is the least common multiple of the video frame time, the audio frame time, and the TS packet time. Accordingly, if the ES and the TS are generated on the basis of the number of frames corresponding to the time, the ES and TS reproduction time are equalized, thereby preventing the discontinuity phenomenon at the time of the repeated reproduction.

This will be explained in detail by using an equation.

First, the time T in which the ES and the TS are equalized is obtained by using a relation among the video frame rate $R_v$, the audio frame rate $R_a$, and the TS packet transmission rate $R_t$.

$$T = n_{vf}[\text{frames}]/R_v[\text{frames/sec}] = n_{af}[\text{frames}]/R_a[\text{frames/sec}] = n_{tp}[\text{packets}]/R_t[\text{packets/sec}]$$

Herein, the $n_{vf}$ denotes the number of the video frames, $n_{af}$ denotes the number of the audio frames, and $n_{tp}$ denotes the number of the TS packet, which are respectively integral.

Also, a minimum time $T_{min}$ which satisfies the above relation is obtained as following.

$$T_{min} = \text{L.C.M.}[1/R_v[\text{sec/frame}], 1/R_a[\text{sec/frame}], 1/R_t[\text{sec/packet}]]$$

Herein, the L.C.M. denotes the least common multiple. That is, the minimum time $T_{min}$ for equalizing the TS reproduction time and the ES reproduction time is the least common multiple of the video frame time, the audio frame time, and the TS packet time. If the ES and TS are generated on the basis of the number of frames corresponding to the time, the ES reproduction time and the TS reproduction time are equalized, so that the discontinuity phenomenon does not occur at the time of the repeated reproduction.

Hereinafter, examples to obtain the minimum time $T_{min}$ for equalizing the TS reproduction time and the ES reproduction time by KDTV(Korea Digital Television) and ATSC (Advanced Television System Committee) will be explained.

In the KDTV and ATSC standard, a transmittance rate of the TS is 19.392658 [Mbps] and the TS packet is constituted with 188 byte, so that the transmittance rate of the TS packet $R_t$ satisfies a following equation, $R_t = (19.392658 \times 10^6 [\text{bits/sec}])/(188[\text{bytes/packet}] \times 8 [\text{bits/byte}]) \approx 12887.406 [\text{packets/sec}]$. In case of 1080I video format supported by the KDTV and the ATSC standard, the minimum integer $T_{min}$ which satisfies a relation equation for each frame rate is obtained through a computer simulation as a following table 2. Table 2

| Frame rate [Hz] | $T_{min}$ [sec] | $n_{vf}$ [frames] | $n_{tp}$ [packets] | TS size [Gbytes] |
|---|---|---|---|---|
| 23.98 | 94,000 | 2,258,256 | 1,212,041,125 | 227.864 |
| 24 | 752 | 18,048 | 9,696,329 | 1.823 |
| 29.97 | 56,400 | 1,693,692 | 727,224,675 | 136.718 |
| 30 | 752 | 22,560 | 9,696,329 | 1.823 |
| 59.94 | 56,400 | 3,387,384 | 727,224,675 | 136.718 |
| 60 | 752 | 45,120 | 9,696,329 | 1.823 |

As shown in the table 2, in case that the frame rate is 24, 30, and 60, every $T_{min}$ is 52 seconds, which can be enough utilized. That is, when the video frame rate $R_v$ is supposed to be 30 [frames/sec] and the audio frame rate $R_a$ is supposed to be 31.25 [frames/sec], the $T_{min}$ is 752 seconds, the number of the video frame $n_{vf}$ is 22,560, the number of the audio frame $n_{af}$ is 23,500, and the number of the TS packet $n_{tp}$ is 9,696,329. According to this, if the ES and TS of the 752 seconds are constructed, the discontinuity phenomenon does not occur. Like this, if the ES and TS constructed by the 752 seconds are stored in a computer storage medium (for example, the test stream storage mean or the image storage mean of FIG. 3 and then repeatedly reproduced, the discontinuity phenomenon does not occur.

As another example of the minimum time $T_{min}$ for equalizing the TS reproduction time and the ES reproduction time, a standard of the Korean satellite broadcasting will be explained.

In case of the Korean satellite broadcasting standard, a transmittance rate of the TS is 34.352 [Mbps], and the TS packet is constructed with 188, so that the transmittance rate of the TS packet $R_t$ satisfies a following equation, $R_t$= (34.352 ×106 [bits/sec])/(188 [bytes/packet]×8[bits/byte]) □ 22840.4255 [packets/sec].

The minimum integer $T_{min}$ which satisfies a relation equation for each frame rate supported by the Korean satellite broadcasting standard is obtained through a computer simulation as a following table 3.

TABLE 3

| Frame rate [Hz] | $T_{min}$ [sec] | $n_{vf}$ [frames] | $n_{tp}$ [packets] | TS size [Gbytes] |
|---|---|---|---|---|
| 23.98 | 5,875.00 | 141,141 | 134,187,500 | 25.227 |
| 24 | 11.75 | 282 | 268,375 | 0.05 |
| 29.97 | 32,900.00 | 987,987 | 751,450,000 | 141.273 |
| 30 | 4.70 | 141 | 107,350 | 0.02 |
| 59.94 | 16,450.00 | 987,987 | 375,725,000 | 70.636 |
| 60 | 2.35 | 141 | 53,675 | 0.01 |

As shown in the table 3, in case that the frame rate is 24, 30, and 60, every $T_{min}$ is 15 seconds or under, which can be enough utilized.

In the meantime, in case of the TS stream including an audio stream of the minimum integer unit, the minimum integer $T_{min}$ which satisfies a relation equation for each frame rate supported by the Korean satellite broadcasting standard is obtained through a computer simulation as a following table 4.

TABLE 4

| Frame rate [Hz] | $T_{min}$ [sec] | $n_{vf}$ [frames] | $n_{tp}$ [packets] | TS size [Gbytes] |
|---|---|---|---|---|
| 23.98 | 5,875.00 | 141,141 | 134,187,500 | 25.227 |
| 24 | 47.00 | 1128 | 1,073,500 | 0.202 |

TABLE 4-continued

| Frame rate [Hz] | $T_{min}$ [sec] | $n_{vf}$ [frames] | $n_{tp}$ [packets] | TS size [Gbytes] |
|---|---|---|---|---|
| 29.97 | 32,900.00 | 987,987 | 751,450,000 | 141.273 |
| 30 | 47.00 | 1410 | 1,073,500 | 0.202 |
| 59.94 | 16,450.00 | 987,987 | 375,725,000 | 70.636 |
| 60 | 47.00 | 2820 | 1,073,500 | 0.202 |

As shown in the table 4, in case that the frame rate is 24, 30, and 60, every $T_{min}$ is 47 seconds, which can be enough utilized.

Figure 6:
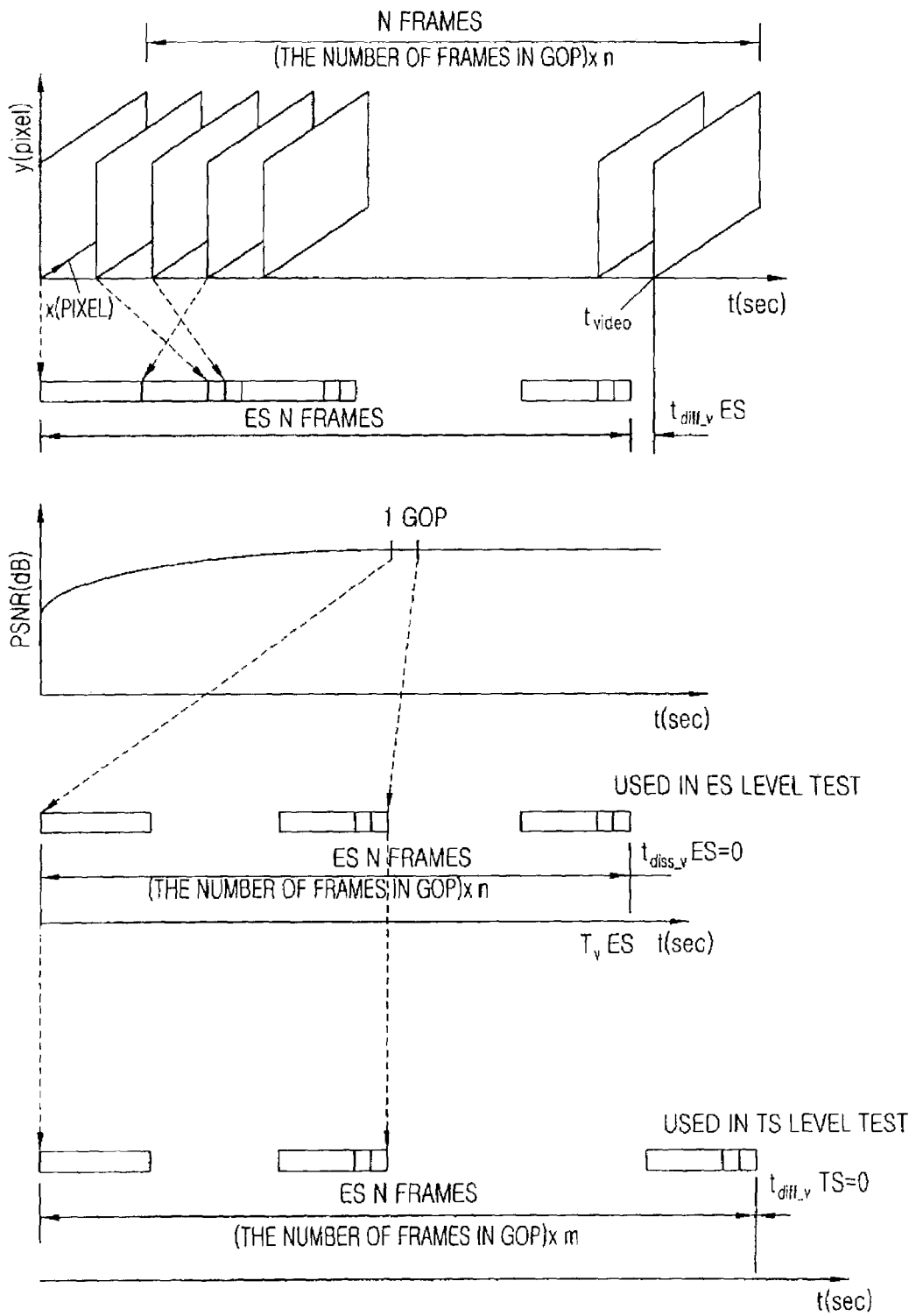
FIG. 6 is an exemplary view showing processes for generating a stream for a video test according to the present invention.

FIG. 6 is an exemplary view showing processes for generating a stream for a video test according to the present invention.

As shown in FIG. 6, a stabilized section 1 groups of pictures GOP based on a peak signal to noise ratio (PSNR) is selected so as to overcome the time difference $t_{diff\_vES}$ between the video frame reproduction time $t_{video}$ and the ES N frame reproduction time when the video frame (the number of the frames in the GOP×n) is compressed into the ES level. Then, the selected GOP is compressed into the ES level. Then, the ES is generated by repeating the ES N frame so that the $t_{diff\_vES}$ can become 0. Again, the TS is generated by repeating the ES M frame so that the $t_{diff\_vTS}$ can become 0. According to this, the stream for the video test is performed.

Figure 7:
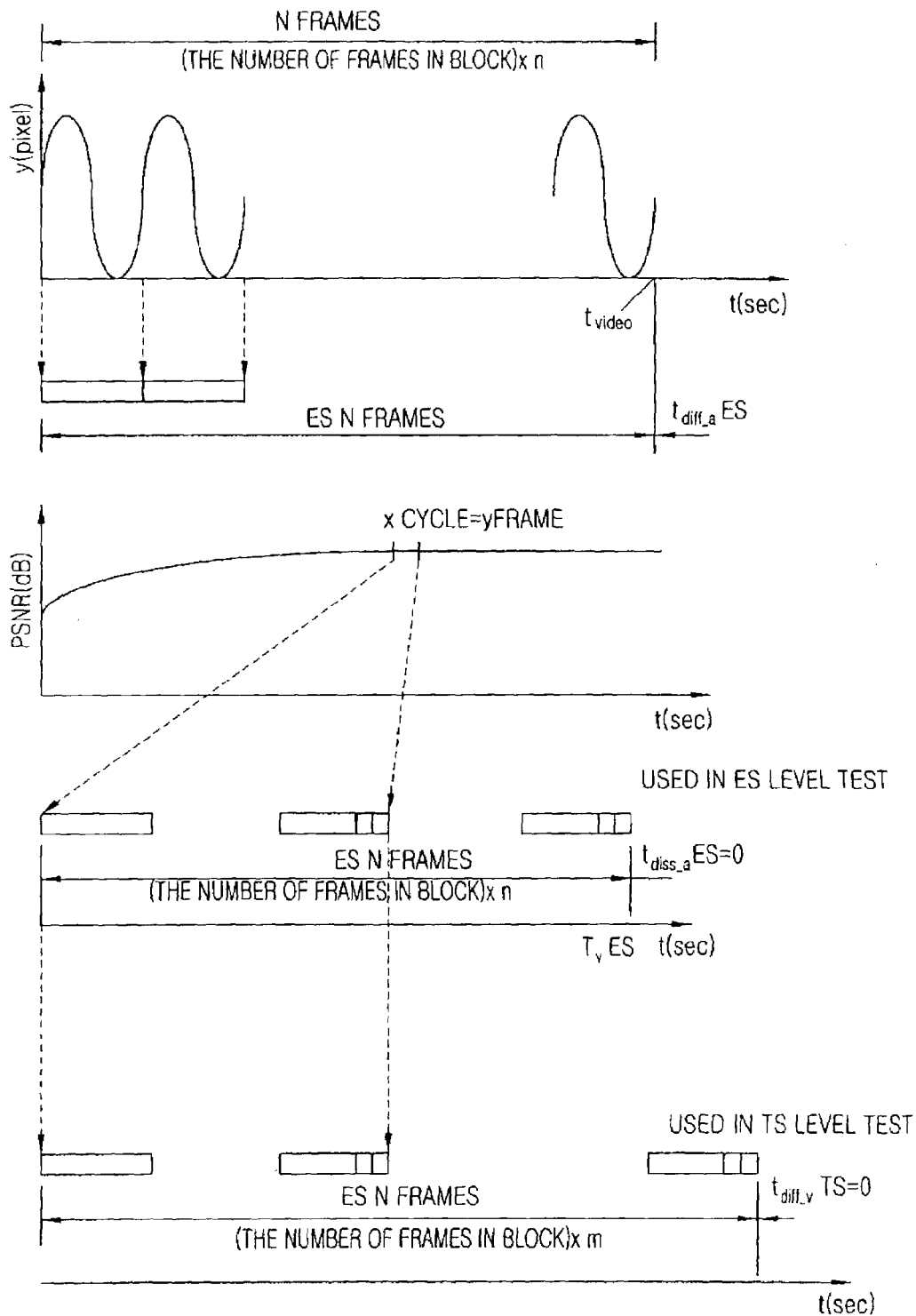
FIG. 7 is an exemplary view showing processes for generating a stream for an audio test according to the present invention.

FIG. 7 is an exemplary view showing processes for generating a stream for an audio test according to the present invention.

As shown in FIG. 7, a stabilized section 1 cycle based on the peak signal to noise ratio (PSNR) is selected so as to overcome the time difference $t_{diff\_aES}$ between the video frame reproduction time $t_{audio}$ and the ES N frame reproduction time when the audio frame (the number of samples in a block×n) is compressed into the ES level. Then, the selected section is compressed into the ES level. Then, the ES is generated by repeating the ES N frame so that the $t_{diff\_aES}$ can become 0. Again, the TS is generated by repeating the ES M frame so that the $t_{diff\_aTS}$ can become 0. According to this, the stream for the audio test is performed.

As aforementioned, in the present invention, the test stream for the function test or the performance valuation of the DTV receiver is generated, and the reproduction time is equalized on the basis of the least common multiple of the video frame time, the audio frame time, and the TS packet time when the test stream is repeatedly reproduced, thereby preventing the discontinuity phenomenon of the video and the audio. Accordingly, when the present invention is used at the DTV production field where the test pattern is used or at the broadcasting system which repeatedly transmits the DTV stream of a limited length such as a stationary image, a reliability of the DTV receiver test can be ensured.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A digital television (DTV) test stream generator comprising:
   a test stream storage circuit to store a test stream which includes equalized reproduction times of a transport stream TS and an elementary stream ES recorded with a predetermined time length for a DTV receiver test; and
   a reproduction circuit for reproducing and outputting the test stream including the TS and ES stored in the test stream storage circuit by repeating per the predetermined time length, wherein the test stream is stored in the test stream storage circuit based on a least common multiple of a video frame time, an audio frame time, and a TS packet time.

2. The generator of claim 1, wherein the test stream stored in the test stream storage circuit is ES/TS constituted as a predetermined time unit, a plurality of streams having various patterns and reproduction time length by a DTV broadcasting method and a performance valuation of the DTV receiver are stored, and one of the plurality of streams is selected.

3. The generator of claim 1, wherein the test stream stored in the test stream storage circuit is one of TS/ESs having a reproduction time of 752, 47, 11.75, 4.7 and 2.35 seconds.

4. The generator of claim 1, wherein the reproduction circuit includes:
   a multiplexer for multiplexing the test stream stored in the test stream storage circuit and outputting; and
   a control circuit for controlling the test stream stored in the test stream storage circuit in order to repeatedly output it through the multiplexer for a DTV test.

5. The generator of claim 4, further including:
   a user's interface for controlling a selection and an output of the test stream; and
   a display means.

6. The generator of claim 5, wherein the user interface means is a key board, a key pad, a mouse, or a touch screen, and the display means is an HDTV or a PC momtor.

7. The generator of claim 1, wherein the test stream storage circuit is a semiconductor memory, an HDD, or an optic recording/reproducing media.

8. A method for generating a test stream, comprising:
   searching for audio/video (A/V) source outputting a data stream;
   compressing the data stream output from the A/V source into an ES level;
   selecting a section in the compressed A/V stream where a picture quality is ensured; and
   outputting ES/TS repeatedly per a predetermined time, said outputting including equalizing an ES reproduction time and a TS reproduction time at a time of repeatedly reproducing the compressed A/V stream of the selected section.

9. The method of claim 8, further comprising:
   multiplexing the ES for a TS matching time;
   channel-coding the TS stream;
   RE modulating the channel-coded stream; and
   channel up-converting the RE modulated TS stream.

10. The method of claim 8, wherein the ES/TS reproduction time is the least common multiple of a video frame time, an audio frame time, and a TS packet time.

11. The method of claim 8, wherein the compressed A/V stream corresponding to the selected section is repeated for an ES matching time to constitute an ES having no reproduction time difference, and the compressed A/V stream corresponding to the selected section is repeated for, a TS matching time to constitute a TS having no reproduction time difference in the step of repeatedly outputting the ES/TS.

12. The method of claim 8, wherein the video source is a predetermined image frame obtained by converting a video signal photographed by a camera into a digital signal, and the audio source is an audio sample obtained by converting an audio signal detected through a microphone into a digital signal in the step of searching audio/video source.

13. The method of claim 8, wherein the A/V source uses data generated from a PC on the basis of a program and system information protocol (PSIP), a transmittance standard prescribed in American advanced television system committee in the step of searching A/V source.

14. The method of claim 8, wherein when the data stream for the test is a moving image, a stabilized section is selected in the stream compressed into the ES level, and when the data stream for the test is a stationary image, a multiple of a signal source is selected.

15. The method of claim 8, wherein the test stream is one of ES/TSs having a reproduction time corresponding to one of the following:
   a reproduction time of 752 seconds for a first frame rate,
   a reproduction time of 47 seconds for a second frame rate,
   a reproduction time of 11.75 seconds for a third frame rate,
   a reproduction time of 4.7 second for a fourth frame rate, or
   a reproduction time of 2.35 seconds for a fifth frame rate.

16. A computer-readable medium, comprising:
   at least one elementary stream (ES) and at least one transport stream (TS) having an ES reproduction time and a TS reproduction time equalized on the basis of the least common multiple of a video frame time, an audio frame time, and a TS packet time, the ES and TS stored in a form accessible by a testing system for testing a product.

17. The computer-readable medium of claim 16, wherein the ES and TS are accessed by the testing system in a predetermined pattern and a time unit to form a test stream based on at least one a function of the product to be tested, a performance valuation, or a size of a DTV system.

18. The computer-readable medium of claim 16, wherein the ES and TS are accessed to form a test stream having a reproduction time of one of 752, 47, 11.75, 4.7 or 2.35 seconds.

19. The computer-readable medium of claim 16, wherein the computer-readable medium is a semiconductor memory, an HDD, or an optic/reproducing media.

20. The method of claim 15, wherein two or more of the first through fifth frame rates may be a same frame rate but for different digital television standards.

21. The method of claim 17, wherein the ES and TS are recorded on the computer-readable medium in a manner sufficient to form two test streams.

22. A method, comprising:
   recording at least one elementary stream (ES) and at least one transport stream (TS) on a computer-readable medium, said recording including equalizing ES and TS reproduction times based on a common multiple of a video frame time, an audio frame time, and a TS packet time; and
   providing the computer-readable medium for use by a testing system to test a product based on the equalized ES and TS.

23. The method of claim 22, wherein said common multiple is a least common multiple.

24. The method of claim 22, wherein the product includes a digital television receiver.

25. The method of claim 22, wherein the ES and TS are combined in a predetermined pattern to form a test stream based on at least one a function, a performance valuation, and a size of a DTV system to be tested.

26. The method of claim 22, wherein the ES andTS are accessed by the testing system to form a test stream having period which corresponds to a predetermined equalized reproduction time.

27. A signal generator, comprising:
a storage circuit to store a test stream that includes equalized reproduction times of a transport stream TS and an elementary stream ES; and
a reproduction circuit to repeatedly reproduce the test stream stored in the storage circuit for use in testing a digital television receiver, wherein the test stream is stored in the storage circuit based on a common multiple of a video frame time, an audio frame time, and a TS packet time.

28. The signal generator of claim 27, wherein said common multiple is a least common multiple.

29. The signal generator of claim 27, wherein the video frame time and audio frame time respectively correspond to video and audio data included in the ES.

* * * * *